United States Patent [19]

Kinoshita

[11] Patent Number: 4,761,754
[45] Date of Patent: Aug. 2, 1988

[54] VECTOR PROCESSOR WHEREIN OUTPUTS OF VECTOR REGISTERS ARE FIXEDLY COUPLED TO INPUTS OF VECTOR CALCULATORS

[75] Inventor: Seiichiro Kinoshita, Tokyo, Japan

[73] Assignee: NEC Corporation, Tokyo, Japan

[21] Appl. No.: 648,259

[22] Filed: Sep. 7, 1984

[30] Foreign Application Priority Data

Sep. 9, 1983 [JP] Japan .................. 58-165956

[51] Int. Cl.[4] .......................... G06F 7/00; G06F 9/00
[52] U.S. Cl. .................................. 364/736; 364/200
[58] Field of Search ............... 364/736, 200 MS File, 364/724, 900 MS File

[56] References Cited

U.S. PATENT DOCUMENTS

| 4,128,880 | 12/1978 | Cray, Jr. .................. | 364/200 |
| 4,302,818 | 11/1981 | Niemann ................... | 364/736 |
| 4,435,765 | 3/1984 | Uchida et al. ............. | 364/736 |
| 4,490,786 | 12/1984 | Nakatani .................. | 364/736 |
| 4,617,625 | 10/1986 | Nagashima et al. ........ | 364/200 |

FOREIGN PATENT DOCUMENTS

| 0058580 | 4/1984 | Japan .................. | 364/736 |
| 2136172A | 9/1984 | United Kingdom ....... | 364/724 |

Primary Examiner—Gary V. Harkcom
Assistant Examiner—Long Thanh Nguyen
Attorney, Agent, or Firm—Foley & Lardner, Schwartz, Jeffery, Schwaab, Mack, Blumenthal & Evans

[57] ABSTRACT

In a vector processor which is for use in combination with a main memory (11) and includes an input selecting arrangement (36), vector registers (21-28), a vector operation arrangement (31-34), and a store register (38). An output selecting circuit is not used on selecting operand vectors from vectors held in the vector registers. Instead, the vector registers are fixedly coupled to the vector operation arrangement to raise speed of operation and to simplify vector instructions. Preferably, vector memories are provided to retain vectors which need not be held in the vector registers and must have been stored in the main memory. In this event, a vector bypassing arrangement is used to bypass a result vector from the vector operation arrangement to one of the vector memories for storage therein as a bypassed vector. The input selecting arrangement is used on moving the bypassed vector to one of the vector registers.

5 Claims, 7 Drawing Sheets

FIG. I
PRIOR ART
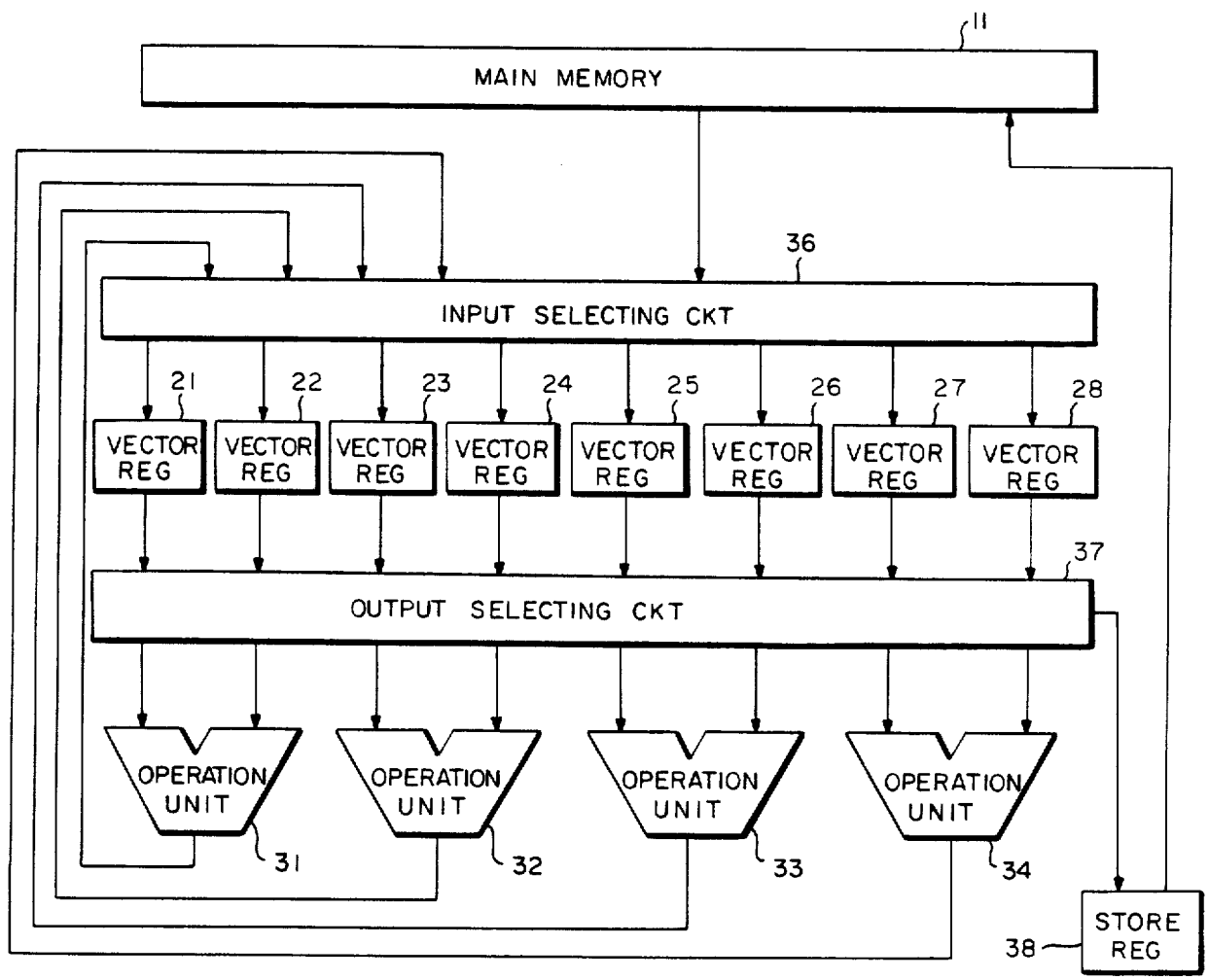
FIG. 2
PRIOR ART
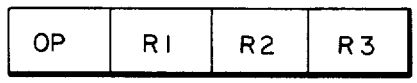

4,761,754

VECTOR PROCESSOR WHEREIN OUTPUTS OF VECTOR REGISTERS ARE FIXEDLY COUPLED TO INPUTS OF VECTOR CALCULATORS

BACKGROUND OF THE INVENTION

This invention relates to a vector processing device or vector processor for use as a part of an electronic digital computer.

A vector processing device is for use in a high-speed digital computer in combination with a main memory in processing vectors or vector data. Each vector is an ordered set or array of elementary data.

A vector processor of the type described, is disclosed in U.S. Pat. No. 4,128,880 issued to Seymour R. Cray, Jr., and assigned to Cray Research, Inc., Wis., U.S.A. The vector processor of Cray, Jr., is effective in achieving an extremely high speed of operation.

As will later be described with reference to one of ten figures of the accompanying drawing, the vector processor comprises a plurality of vector registers according to Cray, Jr. Each vector register is for holding a vector. A vector operation arrangement may comprise a plurality of vector calculators or vector operation units, such as an arithmetic unit and a logical operation functional unit. Each vector operation unit has at least two input terminals and an output terminal for carrying out a vector operation on operand vectors received at the input terminals to produce a result vector at the output terminal. The main memory is for storing a vector as a stored vector. An input selecting arrangement is for selecting one of the vector registers as a destination register and one of the stored and the result vectors as a load vector to load the destination register with the load vector. It is to be noted that the result vector is herein referred to also as a load vector when the result vector should be stored in the destination register. An output selecting arrangement is for selecting one of the vectors held in the vector registers as a store vector for storage in the main memory. The input and the output selecting arrangements are put into operation by vector instructions of the type known in the art.

According to Cray, Jr., the output selecting arrangement must comprise an output selecting circuit. Responsive to a vector instruction indicative of a vector operation as an operation instruction, the output selecting circuit selects one of the vector registers as a destination register and two of the vector registers as source registers and couples the source registers to the input terminals of one of the vector operation units that is capable of carrying out the vector operation indicated by the vector instruction under consideration.

Since access time is indispensable for the output selecting circuit to access the source registers, the vector instruction must include areas for specifying the source registers. However, due to the included areas, the vector processor is complicated in hardware.

The number of vector registers is, for example, only eight and may not be sufficient to hold the vectors which are given by the result vectors and should be used as the operand vectors. Those of the result vectors which are not very soon used as the operand vectors, must therefore be stored in the main memory. When the vector stored in the main memory as a stored vector must be used as an operand vector, a load operation must be executed to load a pertinent one of the vector registers with the stored vector. It is known in the art that it takes a long time to carry out the load operation.

SUMMARY OF THE INVENTION

It is therefore a general object of the present invention to provide a vector processing device which need not comprise an output selecting circuit for use, for vector operations, in selecting vectors stored in vector registers.

It is another general object of this invention to provide a vector processing device of the type described, which is exempted from an access time used by the output selecting circuit.

It is still another general object of this invention to provide a vector processing device of the type described, for which a vector instruction has a simplified format.

It is yet another general object of this invention to provide a vector processing device of the type described, which is simple in hardware.

It is a specific object of this invention to provide a vector processing device of the type described, which need not often carry out a load operation.

It is possible to specify that a vector processing device to which this invention is applicable, is for use in combination with a main memory for storing a vector as a stored vector and includes a plurality of vector registers each for holding a vector, vector operation means for carrying out a vector operation based on operand vectors to produce a result vector, input selecting means for selecting one of the vector registers as a destination register and one of the stored and the result vectors as a load vector to load the destination register with the load vector, and output selecting means for selecting one of the vectors held in the vector registers as a store vector for storage in the main memory. According to this invention, the vector processing device is characterised in that the vector processing device comprises coupling means for fixedly coupling the vector registers to the vector operation means so that the operand vector are in one-to-one correspondence to the vectors held in the respective vector registers.

According to an aspect of this invention, the above-specified vector processing device further comprises a plurality of vector memories, memory selecting means for selecting one of the vector memories as a selected memory, and vector bypassing means for bypassing the result vector to the selected memory for storage therein as a bypassed vector. The input selecting means comprises first means for selecting the destination register from the vector registers, second means for loading the destination register with the load vector, and third means for loading the destination register with the bypassed vector.

BRIEF DESCRIPTION OF THE DRAWING

FIG. 1 is a block diagram which shows a conventional vector processor and a main memory;

FIG. 2 shows a format of vector instructions used in the vector processor illustrated in FIG. 1;

DESCRIPTION OF THE PREFERRED EMBODIMENTS

Figure 3:
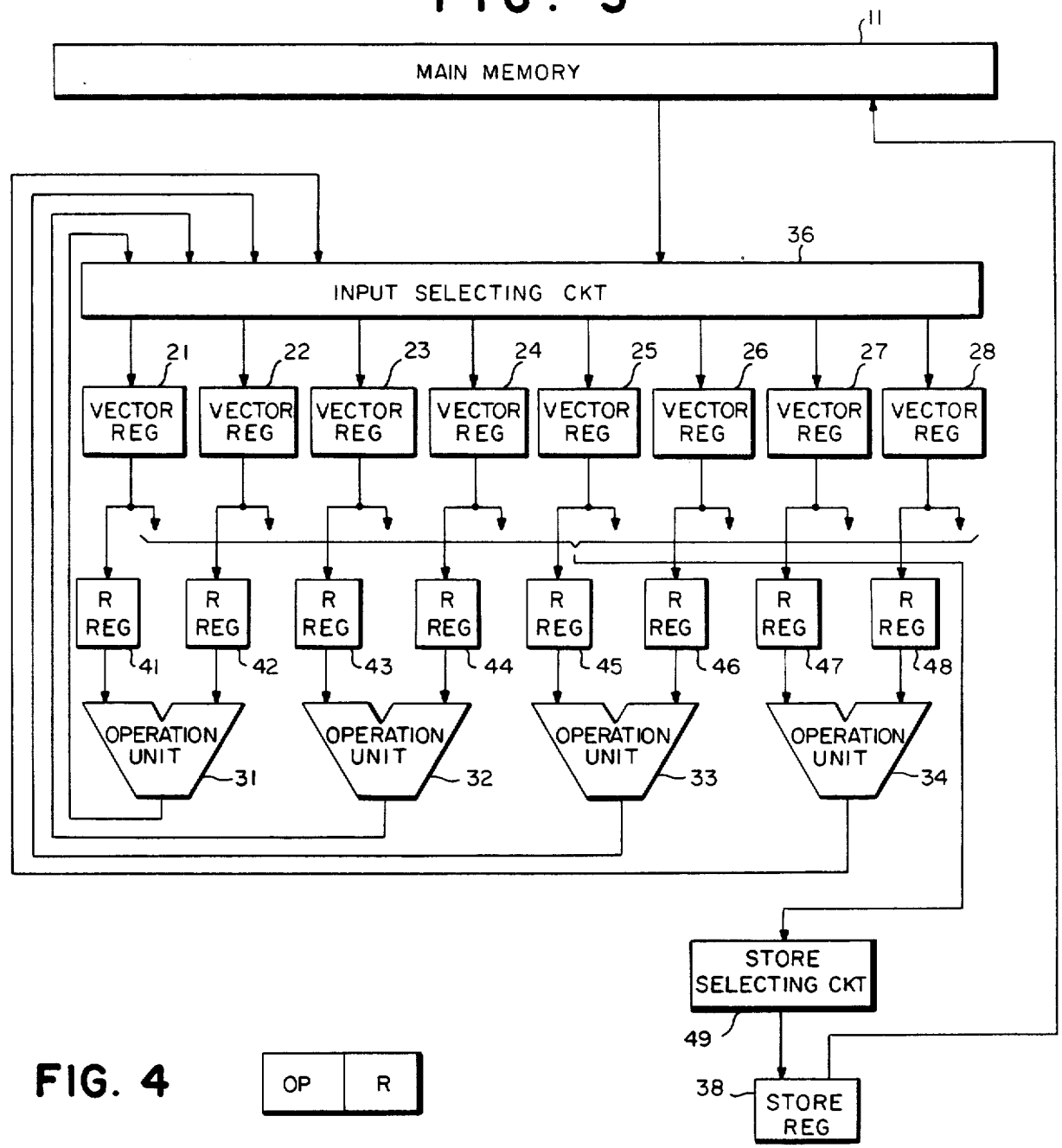
FIG. 3 is a block diagram illustrative of a vector processing device according to a first embodiment of the instant invention and a main memory.

Referring to FIG. 1, a conventional vector processor will be described at first in order to facilitate an understanding of the present invention. The vector processor is what is revealed by Cray, Jr., with reference to FIG. 7 of the above-referenced U.S. patent.

The vector processor is for use in combination with a main memory 11 having a plurality of memory addresses (not shown), each for storing a vector as a stored vector. The vector processor comprises first through eighth vector registers 21, 22, 23, 24, 25, 26, 27, and 28. Each of the vector registers 21 through 28 is for holding a vector as a stored vector. A vector operation arrangement comprises first through fourth vector operation units 31, 32, 33, and 34. The first vector operation unit 31 may be an arithmetic unit for carrying out vector addition as a vector operation. The second vector operation unit 32 may be another arithmetic unit for carrying out vector multiplication as another vector operation. The third vector operation unit 33 may be a logical operation functional unit for carrying out a logical vector operation as still another vector operation. The fourth vector operation unit 34 may be a shifter for carrying out a vector shift operation as yet another vector operation. In the example being illustrated, each of the vector operation units 31 through 34 has two input terminals and an output terminal and is used for carrying out the vector operation based on operand vectors delivered to the respective input terminals to produce a result vector at the output terminal.

An input selecting arrangement or circuit 36 is used for selecting one of the vector registers 21 through 28 as a destination register and one of the stored and the result vectors as a load vector to load the destination register with the load vector. As pointed out heretobefore, the result vector is herein referred to also as a load vector when the destination register should be loaded with the result vector under consideration.

An output selecting circuit 37 is used for selecting two of the vector registers 21 through 28 as source registers and one of the vector operation units 31 through 34 as an acting operation unit to deliver the vectors held in the source registers to the respective input terminals of the acting operation unit as the operand vectors for the acting operation unit, respectively. In the illustrated example, a store register 38 serves as an output selecting arrangement in cooperation with the output selecting circuit 37. Among others, the output selecting arrangement is for selecting one of the vectors held in the vector registers 21 through 28 as a store vector for storage in the main memory 11 as another stored vector.

Turning to FIG. 2, vector instructions are for use, for example, in the input and the output selecting arrangements 36 and 37-38. The vector instructions have a format such that each vector instruction has an operation code area for an operation code OP, a first operand area for a first operand R1, a second operand area for a second operand R2, and a third operand area for a third operand R3.

When the vector instruction is an operation instruction indicative of the vector addition by the operation code OP, the output selecting circuit 37 selects the first vector operation unit 31 as the acting operation unit. The first operand R1 specifies a destination register. The second and the third operands R2 and R3 specify source registers. Responsive to the second and the third operands R2 and R3, the output selecting circuit 37 delivers the vectors held in the source registers to the respective input terminals of the first vector operation unit 31 as the operand vectors. Responsive to the first operand R1, the input selecting circuit 36 loads the destination register with the result vector produced at the output terminal of the first vector operation unit 31.

Referring now to FIG. 3, a vector processing device according to a first embodiment of this invention comprises similar parts designated by like reference numerals. It should be noted that the vector processing device does not comprise the output selecting circuit 37 (FIG. 1). Instead, the first through the eighth vector registers 21 through 28 have output terminals which are fixedly coupled to the input terminals of the vector operation arrangement 31-34 so that the operand vectors are in one-to-one correspondence to the vectors held in the respective vector registers 21 through 28.

More particularly, first and second connections are provided for fixedly coupling the output terminals of the first and the second vector registers 21 and 22 to the input terminals of the first vector operation unit 31. Third and fourth connections are provided for fixedly coupling the output terminals of the third and the fourth vector registers 23 and 24 to the input terminals of the second vector operation unit 32. Fifth and sixth connections are provided for fixedly coupling the output terminals of the fifth and the sixth vector registers 25 and 26 to the input terminals of the third vector operation unit 33. Seventh and eighth connections are provided for fixedly coupling the output terminals of the seventh and the eighth vector registers 27 and 28 to the input terminals of the fourth vector operation unit 34. The first through the eighth connections may also include first through eighth read registers 41, 42, 43, 44, 45, 46, 47, and 48.

The store register 38 accompanies a store selecting circuit 49 rather than the output selecting circuit 37 (FIG. 1). As will become clear as the description proceeds, it is possible to understand that the store selecting circuit 49 serves as an output selecting arrangement in the vector processing device being illustrated. Responsive to a vector instruction which serves as a store instruction indicative of store operation, the store selecting circuit 49 selects one of the vectors held in the vector registers 21 through 28 as a store vector for transfer to the store register 38 and thence for storage in the main memory 11.

Figure 4:
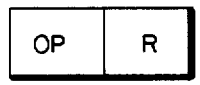
FIG. 4 shows a format of some vector instructions used in the vector processing device illustrated in FIG. 3.

Turning to FIG. 4, vector instructions have a format illustrated therein when the vector instructions are operation instructions indicative of the vector operations. According to the format, each operation instruction has an operation code area for an operation code OP and an operand area for a single operand R. The operation code OP indicates one of the vector operations that should be carried out by the vector operation arrangement 31-34. In other words, the operation code OP specifies one of the vector operation units 31 through 34 as an acting operation unit. Responsive to the single operand R of an operation instruction, the input selecting circuit 36 (FIG. 3) selects one of the vector registers 21 through 28 as a destination register and loads the destination register with a result vector produced at the output terminal of the acting operation unit specified by the operation code OP of the operation instruction under consideration. As described before, the operand vectors for the acting operation unit are the vectors held in two vector registers that are fixedly coupled to the acting operation unit. As will readily be understood, the destination register should be selected so that the destination register may hold the result vector as one of the operand vectors which are subsequently subjected to the same or a different vector operation.

Figure 5:
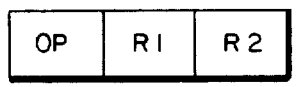
FIG. 5 shows another format of other vector instructions used in the vector processing device depicted in FIG. 3.

Further turning to FIG. 5, vector instructions have a different format when the vector instructions are store and load instructions. Each store or load instruction has an operation code area for an operation code OP, a first operand area for a first operand R1, and a second operand area for a second operand R2. The first operand R1 specifies a destination and the second operand R2, a source.

When the vector instruction is a store instruction in which the operation code OP indicates a store operation, the store selecting circuit 49 selects that one of the vector registers 21 through 28 as a source register which is specified by the second operand R2. The store selecting circuit 49 transfers the vector held in the source register to the store register 38 (FIG. 3) for storage thence in that one of the memory addresses of the main memory 11 stored in the address register which is specified by the first operand R1 as a destination address.

When the vector instruction is a load instruction in which the operand code OP indicates a load operation, the input selecting circuit 36 (FIG. 3) selects that one of the memory addresses of the main memory 11 as a source address stored in the address register which is specified by the second operand R2. The input selecting circuit 36 furthermore selects that one of the vector registers 21 through 28 as a destination register which is specified by the first operand R1. The vector stored in the source address is moved to the destination register for storage therein.

Figure 6:
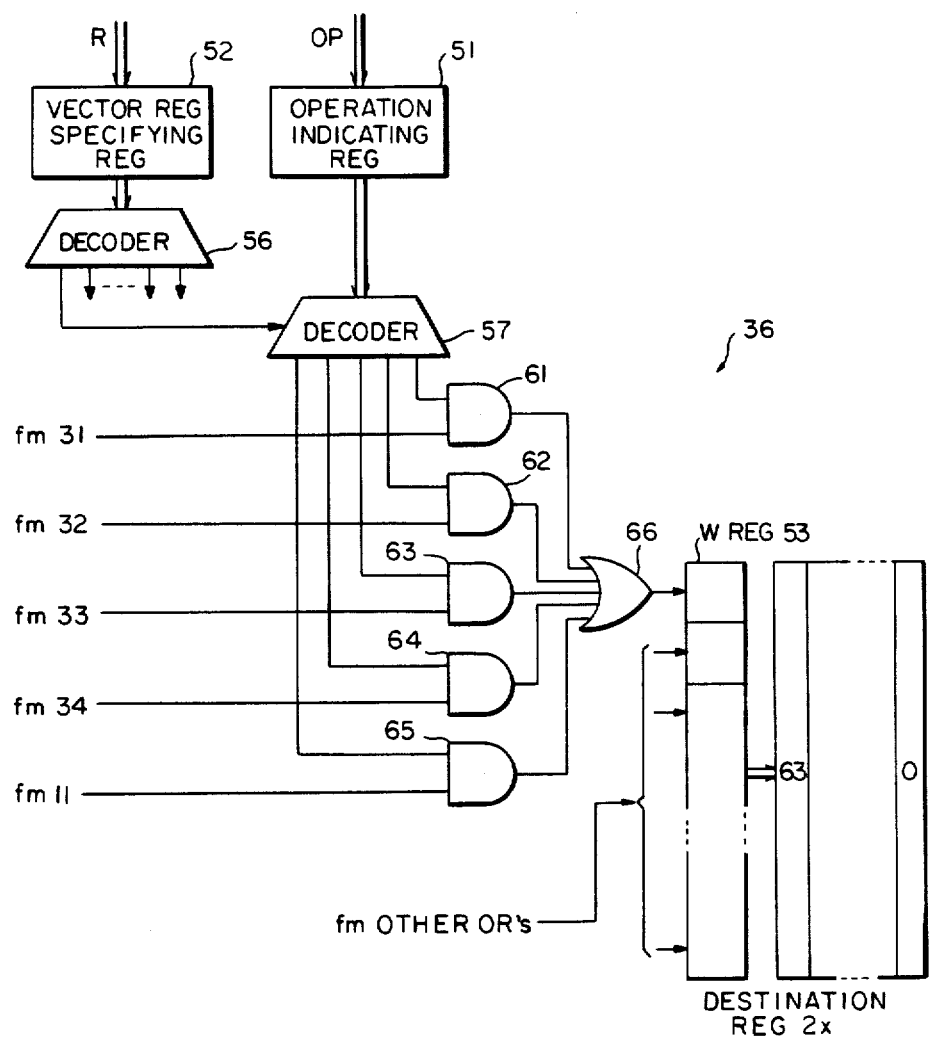
FIG. 6 shows a block diagram of an input selecting circuit for use in the vector processing device illustrated in FIG. 3 together with a vector register used therein.

Referring to FIG. 6, it will be assumed that the input selecting circuit 36 (FIG. 3) is supplied with an operation instruction of the format illustrated with reference to FIG. 4. The operation code OP is stored in an operation indicating register 51. The single operand R is stored in a vector register specifying register 52. As described above, the operand R specifies one of the vector registers 21 through 28 as a destination register. Let the destination register be designated by 2x for the operation instruction under consideration. The destination register 2x is accompanied by a write register 53.

It may be mentioned here that each vector is given by sixty-four elementary data or bits as is the case with the vector processor illustrated with reference to FIG. 1. The sixty-four elementary data are arranged as an ordered set mentioned hereinabove. In this event, each of the vector registers 21 through 28 comprises sixty-four register elements, which are depicted for the destination register 2x at 0 ... 63. In response to a vector instruction indicative of the destination register 2x, the elementary data are successively stored in the respective register elements 0 ... 63 at a rate of the elementary datum per clock period. When the vector register 2x is used as a source register, the elementary data are likewise read out thereof for transfer to that one of the input terminals of an acting operation unit which is fixedly coupled to the source register 2x. As the case may be, the elementary data are delivered to the store register 38.

A first decoder 56 is for decoding the operand R kept in the vector register specifying register 52 to produce a vector register specifying signal which specifies the destination register 2x. The vector register specifying signal is delivered to a second decoder 57, which decodes the operation code OP retained in the operation indicating register 51 to enable one of first through fourth AND gates 61, 62, 63, and 64 coupled to the destination register 2x as will become clear as the description proceeds. A fifth AND gate 65 will later be described.

The first through the fifth AND gates 61 to 65 are for one bit of the vector processed by the vector processing device. The first through the fourth AND gates 61 to 64 are for the result vectors produced by the first through the fourth vector operation units 31 to 34, respectively. The enabled one of the AND gates 61 through 64 therefore corresponds to the vector operation unit that is specified by the operation code OP as an acting operation unit. The result vector produced by the acting operation unit, passes through the enabled AND gate (attention being directed to only one bit of the result vector) and an OR gate 66 and is held in the write register 53.

The fifth AND gate 65 is coupled to the data read from of the main memory 11 (FIG. 3). When the input selecting circuit 36 is supplied with a load instruction having the format shown in FIG. 5, the first decoder 56 decodes the first operand R1 instead of the single operand R to specify one of the vector registers 21 through 28 as a destination register 2x as described above. The second decoder 57 decodes the operand code OP indicative of the store operation to enable the fifth AND gate 65 for the destination register 2x.

Figure 7:
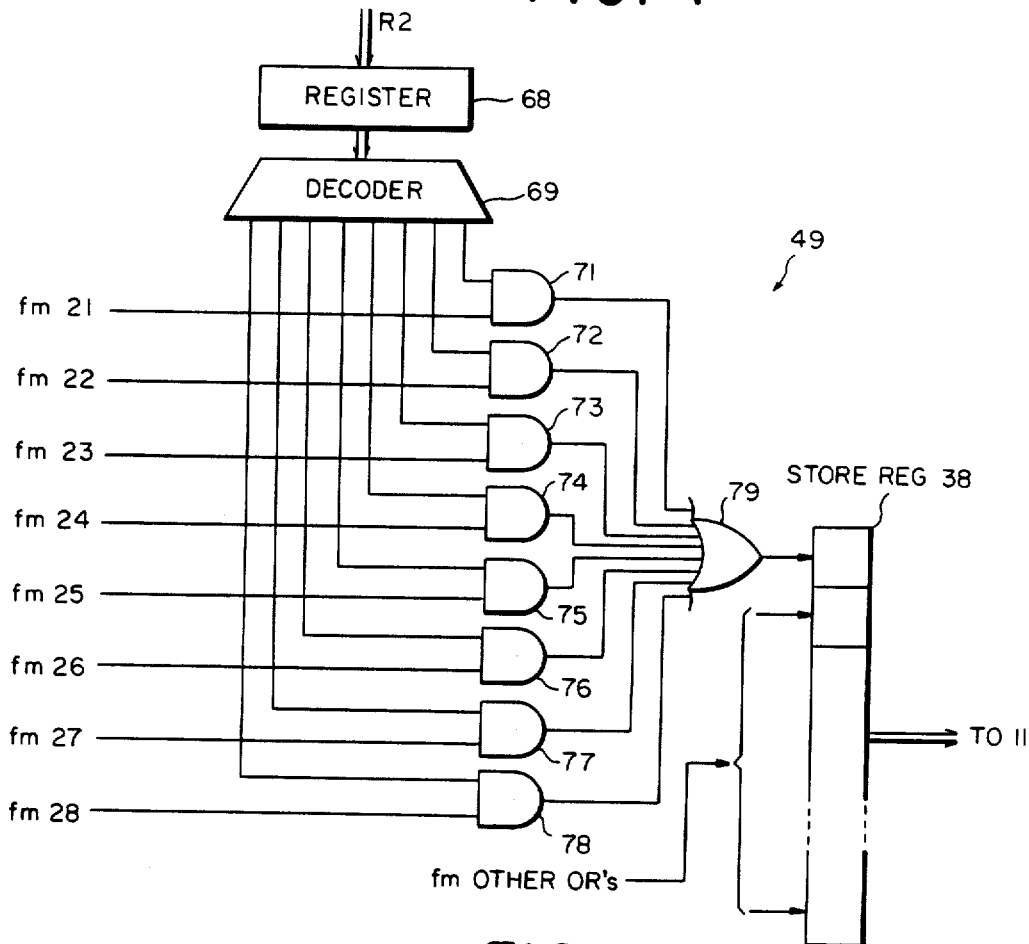
FIG. 7 shows a block diagram of a store selecting circuit for use in the vector processing device depicted in FIG. 3 together with a store register used therein.

Referring to FIG. 7, it will now be assumed that the store selecting circuit 49 is supplied with a store instruction. The store register 38 has a plurality of register elements in correspondence to the respective bits of the vector which should be selected as a store vector for storage in the main memory 11 (FIG. 3). As described above, the first operand R1 of the store instruction specifies one of the memory addresses of the main memory 11 as a destination address and the second operand R2, as one of the first through the eighth vector registers 21 to 28 as a source register.

A single register 68 is for storing the second operand R2. A decoder 69 decodes the second operand R2 to enable one of first through eighth AND gates 71, 72, 73, 74, 75, 76, 77, and 78, which are coupled to the first through the eighth vector registers 21 to 28, respectively. As in FIG. 7, the AND gates 71 through 78 are for only one bit of the store vector. The store vector is transferred through the enabled AND gate and an OR gate 79 to that register element of the store register 38 which is for the only one bit being illustrated.

Figure 8:
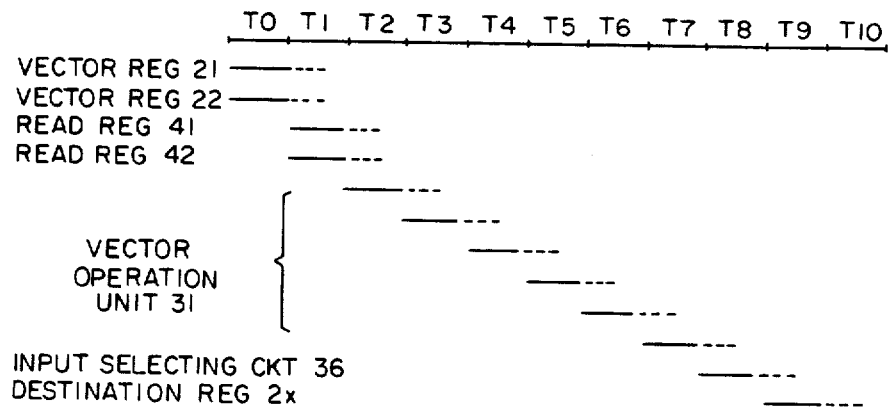
FIG. 8 is a time chart for use in describing operation of the vector processing device shown in FIG. 3.

Referring to FIG. 8, operation will be described more in detail in regards to an operation instruction indicative of one of the vector operations carried out by the vector operation arrangement 31–34 (FIG. 3). The operation instruction has the format of FIG. 4. It will be assumed merely for simplicity of the description that the operation code OP indicates the vector addition and consequently the first vector operation unit 31 as an acting operation unit. Zeroth through tenth timings are illustrated along the top line at T0 through T10.

The vectors held in the first and the second vector registers 21 and 22, are produced at the zeroth timing T0. The vectors are stored in the first and the second read registers 41 and 42 at the first timing T1. The vectors held in the read registers 41 and 42 are delivered at the second timing T2 to the first vector operation unit 31 as the operand vectors. The operand vector are processed in the first vector operation unit 31 as depicted by full lines at the second through the seventh timings T2 to T7. A sum vector is produced as the result vector, which is delivered to the input selecting circuit 36 at the eighth timing T8 as a load vector as herein called. At the ninth timing T9, the load vector is stored in the destination register that is specified by the single operand R of the operation instruction in question.

When the operation code OP indicates the vector multiplication, the second vector operation unit 32 is put into operation. It takes a longer time to carry out the multiplication than the addition. The logical and the shift operations are likewise executed in a similar fashion.

Figure 9A:
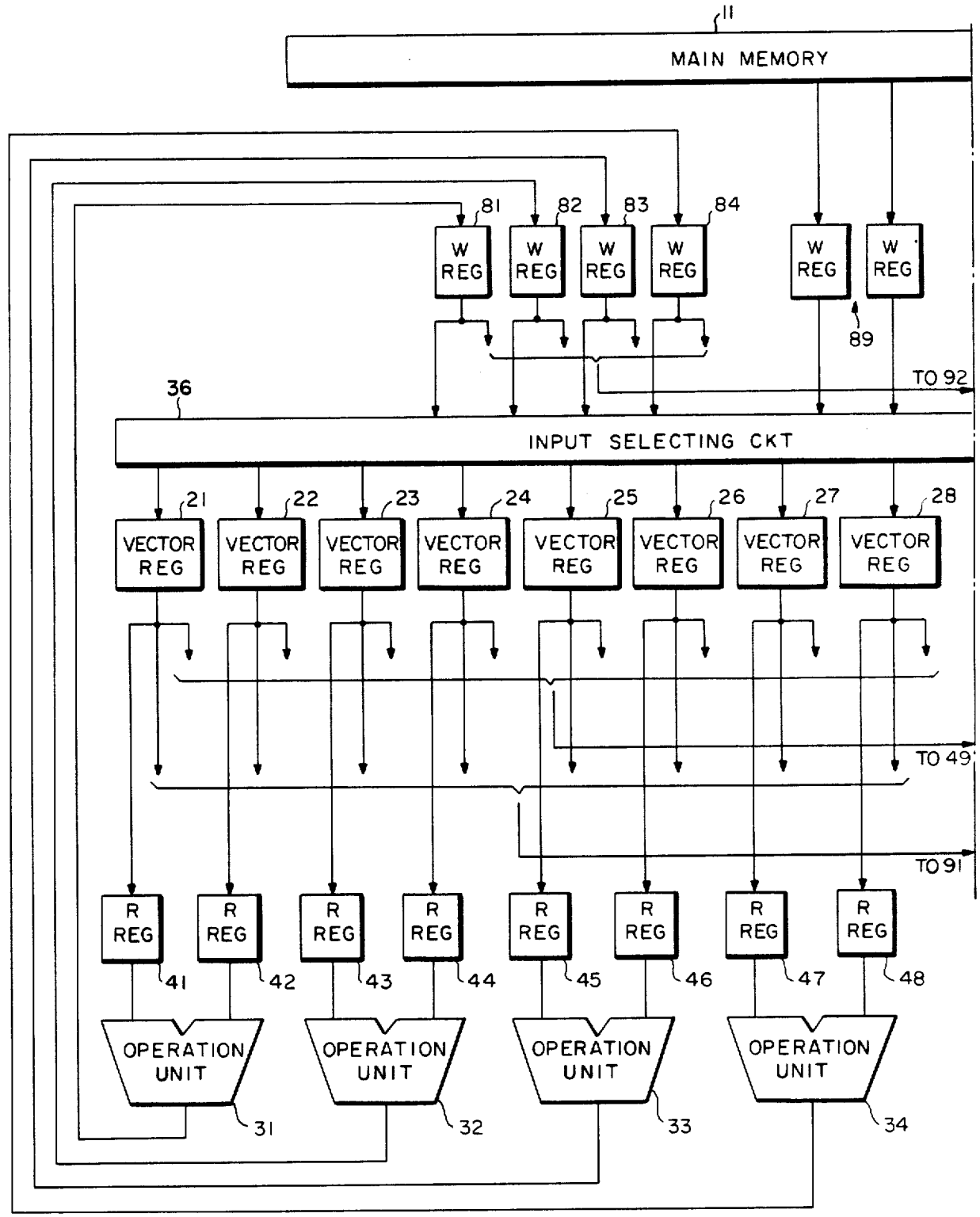
FIGS. 9(a) and (b) show, when placed on the left and the right sides, respectively, a block diagram of a vector processing device according to a second embodiment of this invention and a main memory.
Figure 9B:
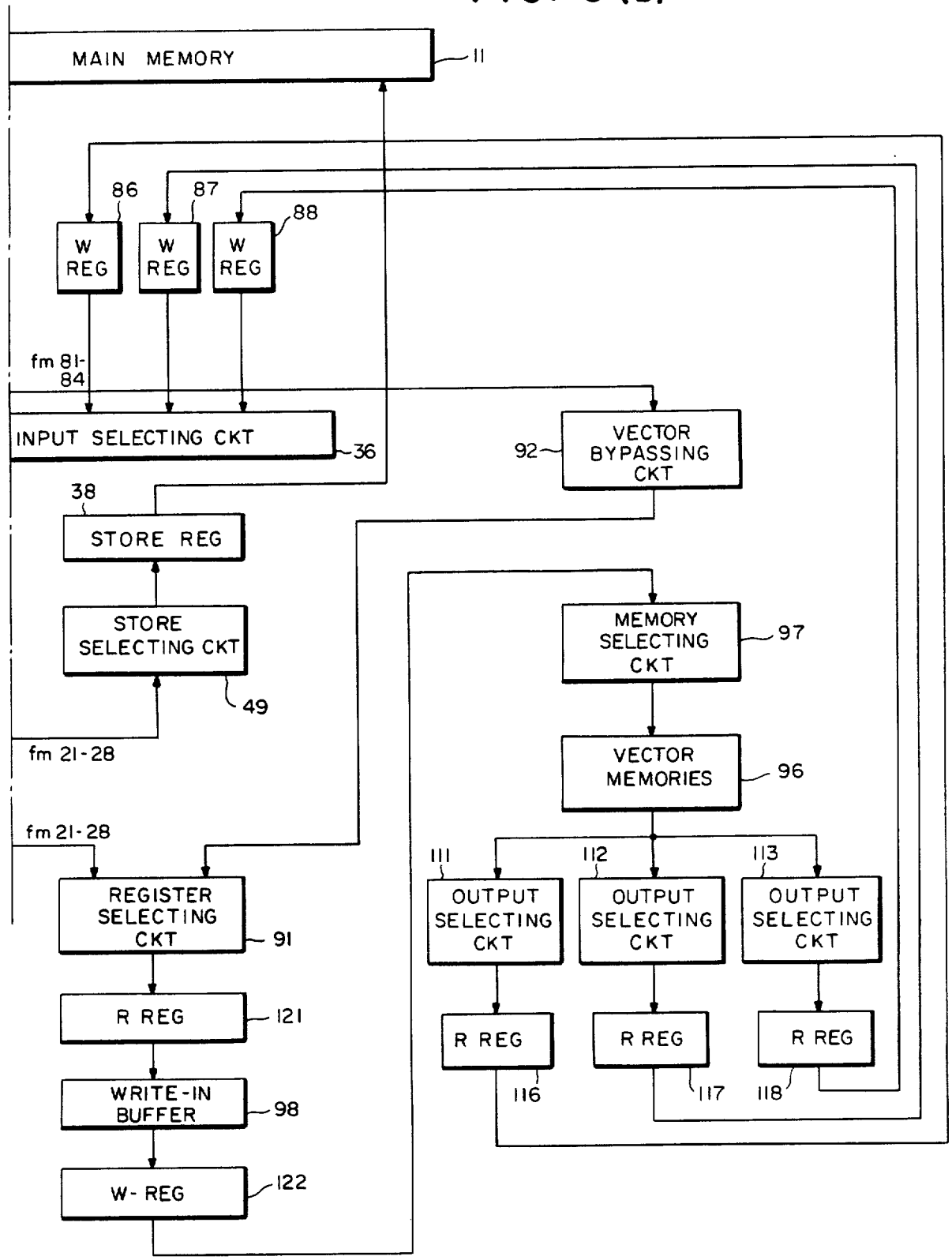

Referring now to FIGS. 9(a) and (b), a vector processing device according to a second embodiment of this invention comprises similar parts which are designated once again by like reference numerals. Depending on the circumstances, the vector registers 21 through 28, the input selecting circuit 36, the read registers 41 through 48, and the source and the destination registers will be referred to with addition of a modifier "primary" to each. First through fourth primary write registers 81, 82, 83, and 84 are interposed between the respective vector operation units 31 through 34 and the primary input selecting circuit 36. First through third additional write registers 86, 87, and 88 have outputs connected to inputs of the primary input selecting circuit 36 for the purpose which will later become clear. Similarly, at least one supplementary write register, collectively indicated at 89, is interposed between the main memory 11 and the primary input selecting circuit 36.

A load instruction of the format of FIG. 5 is executed in the manner described before except that the load vector is moved to the primary input selecting circuit 36 through one of the supplementary write registers 89. An operation instruction of the format of FIG. 4 is executed as described above except that the result vector is stored in the primary destination register through one of the primary write registers 81 through 84 that is interposed between the acting operation unit and the primary input selecting circuit 36. The store instruction of the format of FIG. 5 is executed as before.

It is to be noted that the output terminals of the primary vector registers 21 through 28 are connected to inputs of a first secondary input selecting circuit 91. The first through the fourth primary write registers 81 to 84 have outputs connected to inputs of a second secondary input selecting circuit 92 which has an output connected to an additional input of the first secondary input selecting circuit 91. A plurality of secondary vector registers are collectively depicted at 96. A selector 97 is for selecting one of the secondary vector registers 96 as a secondary destination register. A write-in buffer 98 is an FIFO (first-in first-out) circuit for timing the write-in of a vector in the secondary destination register.

Each of first through third output selecting circuits 111, 112, and 113 is for selecting one of the secondary vector registers as a secondary source register. First through third secondary read registers 116, 117, and 118 are interposed between the first output selecting circuit 111 and the first additional write register 86, between the second output selecting circuit 112 and the second additional write register 87, and between the third output selecting circuit 113 and the third additional write register 88, respectively. The first through the third additional write registers 86 to 88 and the like are used in carrying out the move operation in parallel in response to up to three move instructions as will later be described.

As the case may be, the secondary vector registers 96 are called vector memories in contrast to the primary vector registers 21 through 28, which may now be referred to merely as the vector registers. The selector 97 may be named a memory selecting circuit or arrangement. The secondary destination register may be called a selected memory. Inasmuch as it is unnecessary according to this invention to specify one of the vector registers 21 through 28 as a primary source register, the primary source register may again be referred to merely as a source register as will be described in the following.

In cooperation with other circuit elements which will presently be described, the first secondary input selecting circuit 91 serves as a register selecting circuit or arrangement for selecting one of the vector registers 21 through 28 as a source register. The vector held in the source register is moved to the selected memory for storage therein as a retained vector.

It is possible to understand that the primary input selecting circuit 36 comprises a first part for use in selecting the destination register from the vector registers 21 through 28. When combined with the primary write registers 81 through 84 and the supplementary write registers 89, the first part serves also as a second part for loading the destination register with a load vector as herein called.

The second secondary input selecting circuit 92 may be coupled to the write-in buffer 98 directly rather than through the register selecting circuit 91. In any event, the second secondary input selecting circuit 92 serves in cooperation with the above-mentioned other circuit elements and the primary write registers 81 through 84 as a vector bypassing circuit or arrangement for bypassing the second part of the input selecting circuit 36 to deliver the result vector to the destination memory for storage therein as a bypassed vector.

The bypassed vector is not different by nature from the retained vector and is nothing but a vector retained in one of the vector memories 96. As will shortly become clear, a third part of the input selecting circuit 36 is for loading the destination register either with the retained vector or the bypassed vector by cooperation of the output selecting circuits 111 through 113, the secondary read registers 116 through 118, and the additional write registers 86 through 88.

For the vector processing device being illustrated, it is possible to provide an operation instruction by the format illustrated with reference to FIG. 5. The operation code OP indicates one of the vector operations rather than the load or the store operation. The first operand R1 specifies one of the vector registers 21 through 28 as a destination register and the second operand R2, one of the vector memories 96 as a selected memory, namely, as a destination memory. It is possible to make the operation instruction specify the destination register alone by giving a logic one and a logic zero bit to the most significant bits of the first and the second operands R1 and R2, respectively, In this event, the operation instruction of the format depicted in FIG. 5 is equivalent to the operation instruction of the format of FIG. 4. Alternatively, it is possible to make the operation instruction specify only the destination memory by giving a logic zero and a logic one bit to the most significant bits of the first and the second operands R1 and R2, respectively. Under the circumstances, the result vector is not stored in the destination register but only in the destination memory.

Figure 10:
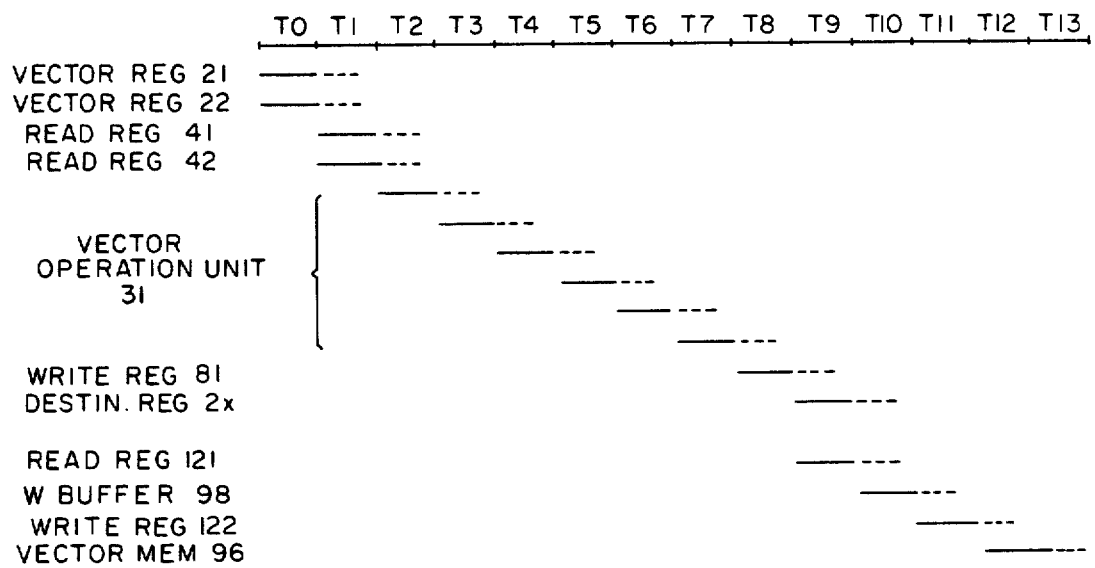
FIG. 10 is a time chart for use in describing operation of the vector processing device depicted in FIGS. 9(a) and (b).

Referring to FIG. 10 in addition to FIGS. 9(a) and (b), operation will be described with an assumption such that the operation instruction has the format of FIG. 5, that the operation code OP indicates the vector addition, and that the first and the second operands R1 and R2 specify a destination register of the vector registers 21 through 28 and a destination memory of the vector memories 96, respectively. Zeroth through thirteenth timings are depicted along the top line at T0 through T13 as in FIG. 8.

As before, the vectors held in the first and the second vector registers 21 and 22 are delivered to the first vector operation unit 31 at the second timing T2 through the first and the second primary read registers 41 and 42. The result vector is delivered to the input selecting circuit 36 through the first primary write register 81 and stored in the destination register at the ninth timing T9.

The result vector is delivered from the first primary write register 81 also to the vector bypassing circuit 92. The result vector is stored in a read register 121 at the ninth timing T9 through the register selecting circuit 91. The result vector is transferred to the write-in buffer 98 at the tenth timing T10. It will be assumed that the result vector is immediately moved to a write register 122 from the write-in buffer 98 at the eleventh timing T11. The result vector is stored in the destination memory as a bypassed vector at the twelfth timing T12 through the memory selecting circuit 97.

In FIGS. 9(a) and (b), the vector processing device is operable in response to a move instruction of a first type having the format of FIG. 5. The operation code OP indicates the transfer of a vector from one of the vector registers 21 through 28 to one of the vector memories 96. The first operand R1 specifies one of the vector registers 21 through 28 as a source register and the second operand R2, one of the vector memories 96 as a destination memory.

Responsive to the first operand R1, the register selecting circuit 91 selects the source register from the vector registers 21 through 28. Responsive to the second operand R2, the memory selecting circuit 97 selects the selected memory or the destination memory from of the vector memories 96. The vector held in the source register as a stored vector, is moved to the destination memory through the register selecting circuit 91, the read register 121, the write-in buffer 98, the write register 122, and the memory selecting circuit 97 and stored therein as a retained vector.

The vector processing device is operable also in response to a move instruction of a second type of the format of FIG. 5. The operation code OP indicates transfer of a vector from one of the vector memories 96 to one of the vector registers 21 through 28. As in the move instruction of the first type, the first operand R1 specifies one of the vector registers 21 through 28. The specified vector register is, however, a destination register rather than a source register. The second operand R2 specifies one of the vector memories 96 as a source memory.

At least one of the first through the third output selecting circuits 111 to 113 that is not busy, is used in executing the move instruction. It will be assumed that the first output selecting circuit 111 is not busy and deals with the move instruction in question.

Responsive to the second operand R2, the first output selecting circuit 111 selects the source memory from the vector memories 96. Responsive to the first operand R1, the input selecting circuit 36 selects the destination register from the vector registers 21 through 28. The vector retained in the source memory as a retained vector, is moved therefrom to the destination register through the first output selecting circuit 111, the first secondary read register 116, the first additional write register 86, and the input selecting circuit 36 and stored in the destination register as a stored vector.

As described hereinabove, the store instructions have the format of FIG. 5. The first operand R1 of each store instruction specifies a destination address. In a store instruction, the second operand R2 may specify a source memory of the vector memories 96 rather than a source register of the vector registers 21 through 28. On executing such a store instruction, it is necessary that at least one of the vector registers 21 through 28 be a vacant register that is not used in holding a stored vector. It will again be surmised that the first output selecting circuit 111 is not busy. The vector retained in the source memory is selected by the first output selecting circuit 111 as a store vector and is stored in the destination address through the first output selecting circuit 111, the first secondary read register 116, the first additional write register 86, the input selecting circuit 36, the vacant register, the store selecting circuit 49, and the store register 38.

It is now possible to understand that each of the first through the third output selecting circuits 111 to 113 serves as a source selecting arrangement for selecting one of the vector memories 96 as a source memory. Each of the output selecting circuits 111 through 113 is similar in this respect to the output selecting circuit 37 described in conjunction with FIG. 1. The source selecting arrangement 111-113, however, does not supply the vector retained in the source memory to the vector operation arrangement 31-34 (FIG. 9(a)). Instead, the retained or the bypassed vector of the source memory is loaded primarily in the destination register of the vector registers 21 through 28 by the third part of the input selecting circuit 36 with the cooperation of a pertinent one of the secondary read registers 116 through 118 and a relevant one of the additional write registers 86 through 88.

The input selecting circuit 36 of FIGS. 9(a) and (b), the register selecting circuit 91, and the vector bypassing circuit 92 may be similar in structure to the input selecting circuit 36 illustrated with reference to FIG. 6. The difference lies only in the fact that the number of inputs is different. Each of the output selecting circuits 111 through 113 may be similar to the store selecting circuit 49 insofar as the structure is concerned.

While this invention has thus far been described in connection with a few preferred embodiments thereof, it will now be readily possible for one skilled in the art to carry this invention into effect in various other manners. For example, the elementary data of each vector may be processed either in bit parallel or in bit series. The number of the data is not restricted to sixty-four in each vector. The vector processing device may comprise a different number of vector registers, such as 21 through 28. It is possible to select the number of vector memories 96 as desried. The vector operation arrangement 31-34 may comprise either only one vector operation unit or more than four vector operation units. Some of the vector operation units may carry out the same vector operation. Only one single secondary input selecting circuit may be used as the register selecting circuit 91 and the vector bypassing circuit 92. Each of the vector registers 21 through 28 may include the primary read register, namely, a pertinent one of the primary read registers 41 through 48, as an entirety. Likewise, the read and/or the write register may be included in the circuit element for which the register is used. When the primary write registers 81 through 84 are included in the respective vector operation units 31 through 34, the vector bypassing circuit 92 or the single secondary input selecting circuit 91-92 is connected directly to the vector operation arrangement 31-34 in the block diagram. Incidentally, the register selecting circuit 91 serves as a vector moving arrangement for moving the vector held in the vector register selected as the source register to a selected or destination memory. When only one secondary input selecting circuit 91-92 is used, the secondary input selecting circuit 91-92 serves as the vector moving arrangement besides as the vector bypassing arrangement. The vector memories 96 are effective also when a result vector must repeatedly used in vector operation carried out by different vector operation units.

What is claimed is:

1. A vector processing device in combination with a main memory for storing vectors as stored vectors, said vector processing device comprising:
   a plurality of vector registers each for holding a vector,
   a plurality of vector operation means for carrying out a vector operation based on operand vectors to produce a result vector,
   input selecting means for selecting one of said vector registers as a destination register and for selecting one of said stored vectors or said result vector as a load vector to load said destination register with said load vector wherein said selected stored vector or said selected result vector is loaded into said selected vector register,
   output selecting means for selecting one of the vectors held in said vector registers as a store vector for storage in said main memory,
   means for fixedly coupling said vector registers to inputs of said plurality of vector operation means so that one of said vector operation means is coupled to receive outputs only from a first plurality of said vector registers and a second one of said vector operation means is coupled to receive outputs only from a second plurality of said vector registers which is different from said first plurality of vector registers wherein said operand vectors specify at least an operation code and the destination register without specifying source registers for said plurality of vector operation means, and
   wherein said vector processing device further comprises selecting means for selecting one of said vector registers as a source register, a plurality of vector memories, memory selecting means for selecting one of said vector memories as a selected memory, and vector moving means for moving the vector held in said source register to said selected memory for storage therein as a retained vector.

2. A vector processing device as claimed in claim 1, wherein said input selecting means comprises first means for selecting said destination register from said vector registers, second means for loading said destination register with said load vector, and third means for loading said destination register with said retained vector.

3. A vector processing device as claimed in claim 1, further comprising source selecting means for selecting one of said vector memories as a source memory, said input selecting means comprising first means for selecting said destination register from said vector registers, second means for loading said destination register with said load vector, and third means for loading said destination register with the retained vector stored in said source memory.

4. A vector processing device in combination with a main memory for storing vectors as stored vectors, said vector processing device comprising:
   a plurality of vector registers each for holding a vector,
   a plurality of vector operation means for carrying out a vector operation based on operand vectors to produce a result vector,
   input selecting means for selecting one of said vector registers as a destination register and for selecting one of said stored vectors or said result vector as a load vector to load said destination register with said load vector wherein said selected stored vector or said selected result vector is loaded into said selected vector register,
   output selecting means for selecting one of the vectors held in said vector registers as a store vector for storage in said main memory,
   means for fixedly coupling said vector registers to inputs of said plurality of vector operation means so that one of said vector operation means is coupled to receive outputs only from a first plurality of said vector registers and a second one of said vector operation means is coupled to receive outputs only from a second plurality of said vector registers which is different from said first plurality of vector registers wherein said operand vectors specify at least an operation code and the destination register without specifying source registers for said plurality of vector operation means, and
   wherein said vector processing device further comprises a plurality of vector memories, memory selecting means for selecting one of said vector memories as a selected memory, and vector bypassing means for passing said result vector to said selected memory for storage therein as a bypassed vector, said input selecting means comprising first means for selecting said destination register from said vector registers, second means for loading said destination register with said load vector, and third means for loading said destination register with said bypassed vector.

5. A vector processing device as claimed in claim 4, further comprising source selecting means for selecting one of said vector memories as a source memory, wherein said third means loads said destination register with the bypassed vector stored in said source memory.

* * * * *